United States Patent

Dörner et al.

[11] Patent Number: 6,006,431
[45] Date of Patent: Dec. 28, 1999

[54] PROCESS FOR PRODUCING A SUBSTANTIALLY TUBULAR HOUSING SUBSTANTIALLY CLOSED ON ALL SIDES

[75] Inventors: Erhard Dörner, Mönchengladbach; Wilhelm Vieten, Wegberg, both of Germany

[73] Assignee: Babcock Sempell AG, Germany

[21] Appl. No.: 08/750,216

[22] PCT Filed: Feb. 14, 1996

[86] PCT No.: PCT/EP96/00637

§ 371 Date: Jan. 12, 1997

§ 102(e) Date: Jan. 12, 1997

[87] PCT Pub. No.: WO96/31300

PCT Pub. Date: Oct. 10, 1996

[30] Foreign Application Priority Data

Apr. 5, 1995 [DE] Germany ............. 19055 12 657

[51] Int. Cl.[6] .................................. B23P 11/00
[52] U.S. Cl. ..................... 29/890.126; 29/890.124; 29/890.13; 29/412; 29/421.1; 251/310; 138/120
[58] Field of Search .............. 29/890.126, 890.127, 29/890.13, 416, 412, 421.1, 890.124; 137/15; 251/310; 138/120, 109; 188/322.19, 322.2

[56] References Cited

U.S. PATENT DOCUMENTS

| 2,966,872 | 1/1961 | Schmocker | 29/416 |
|---|---|---|---|
| 2,981,282 | 4/1961 | Mack | 29/890.126 |
| 3,557,437 | 1/1971 | St. Clair | 29/416 |
| 3,687,493 | 8/1972 | Lock et al. | 285/333 |
| 4,028,796 | 6/1977 | Bergstrom | 29/416 |
| 4,270,732 | 6/1981 | Redman | 251/310 |
| 4,357,952 | 11/1982 | Knecht | 137/15 |
| 4,656,712 | 4/1987 | Harwood et al. | 29/416 |
| 4,840,053 | 6/1989 | Nakamura | 29/421.1 |
| 5,353,898 | 10/1994 | Handke et al. | 188/322.19 |
| 5,362,114 | 11/1994 | Levingston | 138/109 |
| 5,392,516 | 2/1995 | Mazhar | 29/890.13 |
| 5,697,155 | 12/1997 | Bloecker et al. | 29/421.1 |
| 5,839,777 | 11/1998 | Vlahovic | 296/205 |

FOREIGN PATENT DOCUMENTS

| 3923358 | 1/1990 | Germany | 29/412 |
|---|---|---|---|
| 41 03 083 | 5/1992 | Germany | . |
| 4201730 | 7/1993 | Germany | 29/421.1 |

*Primary Examiner*—Lee Young
*Assistant Examiner*—A. Dexter Tugbang

[57] ABSTRACT

To produce a two-part valve housing inexpensively it is proposed to produce from a sleeve-shaped blank (20) by internal high-pressure forming an intermediate product (10) which corresponds to the first housing part in a section lying on one side of a separating surface (T) and to the second housing part in a section lying on the other side of the separating surface (T). Connection sections (24, 32), adjacent to the separating surface, of the intermediate product (20) have different diameters so that cooperating threads by means of which the housing parts are screwed together can be produced on them.

6 Claims, 3 Drawing Sheets

PROCESS FOR PRODUCING A SUBSTANTIALLY TUBULAR HOUSING SUBSTANTIALLY CLOSED ON ALL SIDES

BACKGROUND OF THE INVENTION

1. Field of the Invention

The invention relates to a process for producing a substantially tubular housing substantially closed on all sides, particularly a valve housing, which has at least two housing parts detachably connected together.

2. Description of Relevant Art

When manufacturing such housings, which have to be pressure-tight in the case of valve housings, the two housing parts are usually made separately from blanks, e.g. castings, which are then provided with the necessary connecting means by mechanical machining, in order to be able to connect the housing parts together in a pressure-medium-tight manner after the internal parts of the valve have been installed.

Although such housings meet high quality demands they are expensive to make. For valves produced in large quantities it would be desirable to be able to make the valve housing more cheaply without compromises as regards the security of the connection of the housing parts.

SUMMARY OF THE INVENTION

To achieve this object the invention provides a process for producing a substantially tubular housing substantially closed on all sides, particularly a valve housing, which has at least two housing parts detachably connected together comprising a) producing an intermediate product, which corresponds to the form of the first housing part in a first section thereof and to the form of at least one further housing part in at least one further section thereof by internal high-pressure forming from a substantially sleeve-shaped blank; b) cutting through the intermediate product at least one separating surface (T) lying between said at least two sections to form said at least two housing parts; and c) joining the housing parts in pressure-tight manner.

In the process according to the invention, the per se known internal high-pressure forming process is used to produce the housing contour. With this process it is also possible to produce relatively complicated deviations from the precisely tubular basic geometry of the housing inexpensively and with a constant wall thickness. As the forming takes place by flow of material and not by metal removal, the housing has good mechanical strength.

Advantageous further developments of the invention are quoted in sub-claims.

The further development of the invention makes it possible to allow the connection sections of the two housing parts to overlap in axial direction which is of advantage in respect of a simple mechanically loadable and flow-medium-tight connection of the two housing parts.

Preferably the two housing parts are connected by means of a thread connection which can be simply produced according to the invention.

The invention will be described in greater detail below with the aid of an embodiment with reference to the drawings, in which:

DETAILED DESCRIPTION OF PREFERRED EMBODIMENTS

Figure 1:
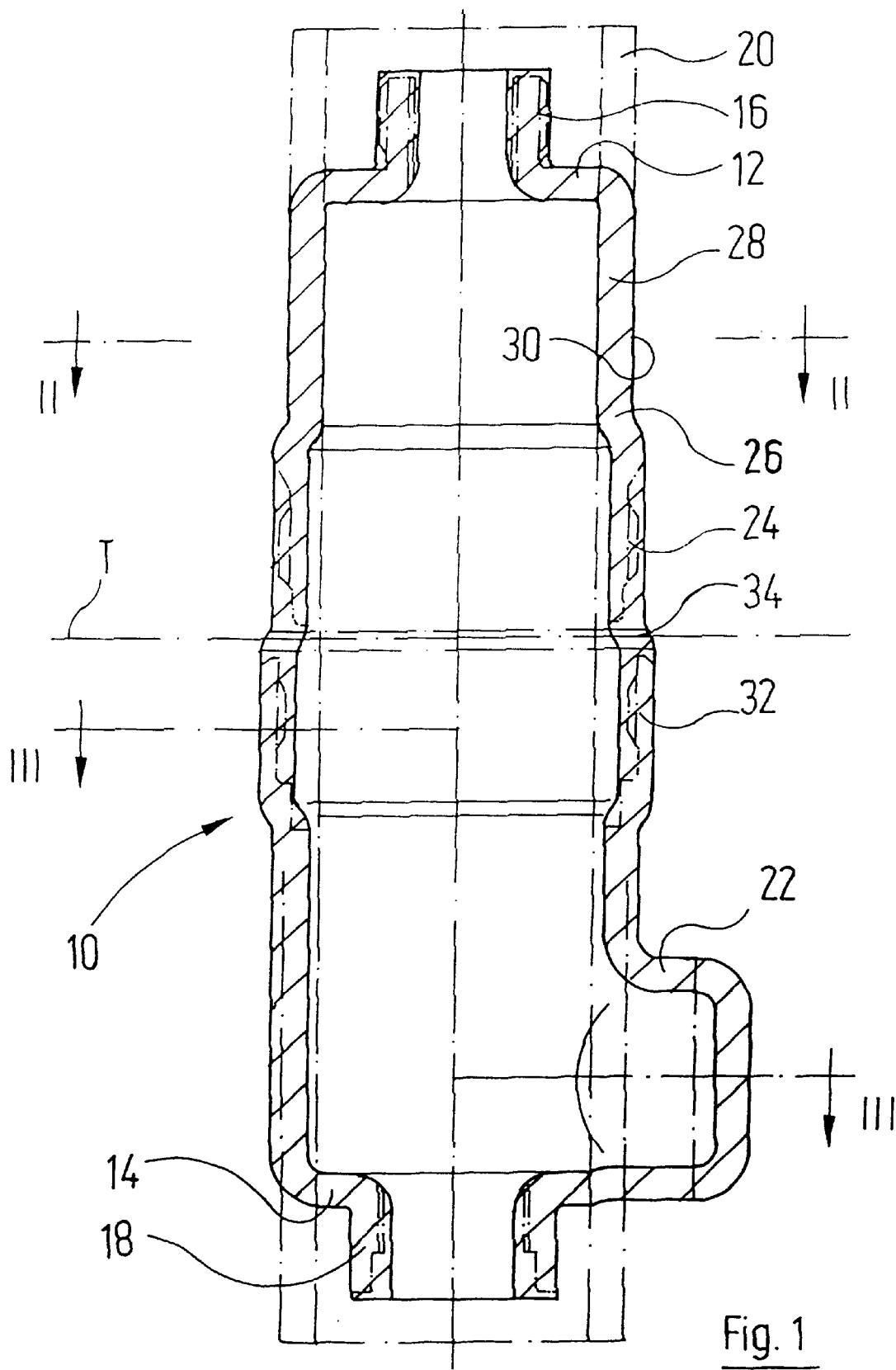
FIG. 1 shows an axial section through an intermediate product which is used in the manufacture of a two-part valve housing.
Figure 2:
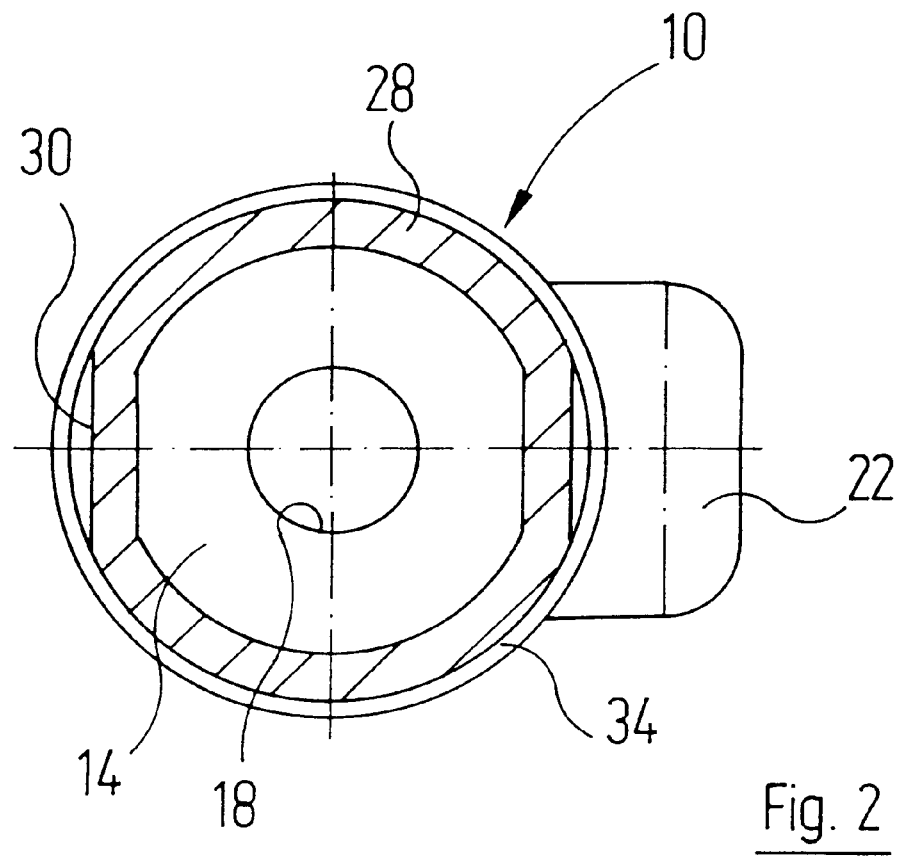
FIG. 2 shows a transverse section through the intermediate product according to FIG. 1 along the line II—II therein.
Figure 3:
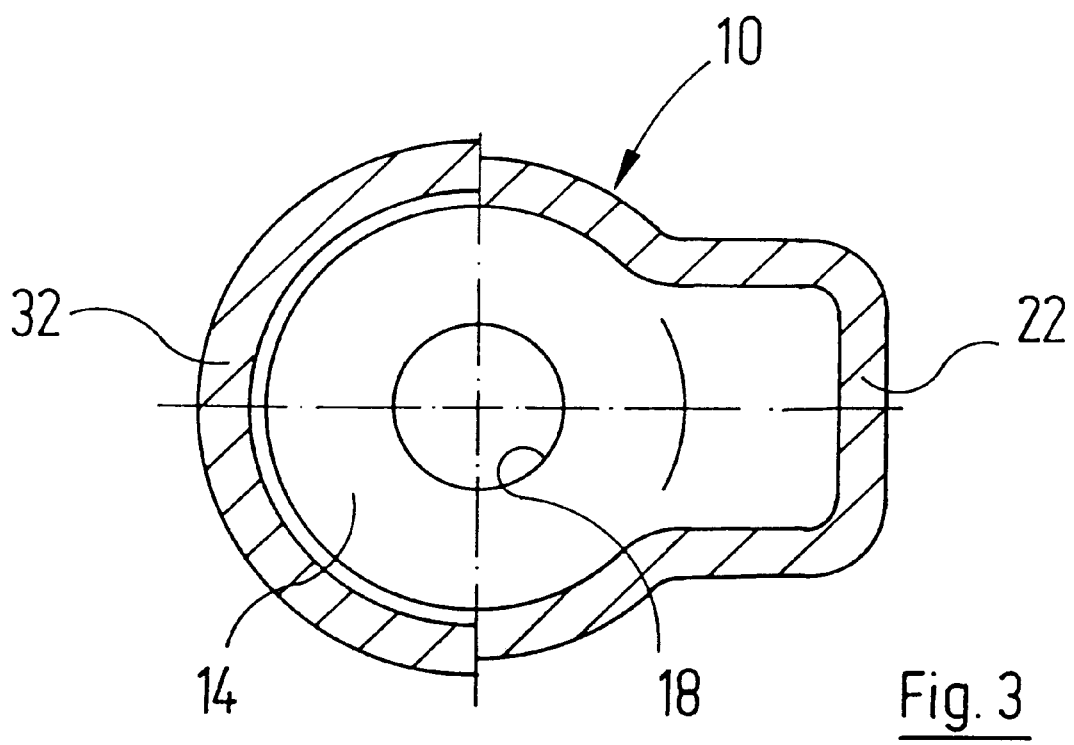
FIG. 3 shows an angled transverse section through the intermediate product according to FIG. 1 along the line III—III therein.

FIG. 1 shows an intermediate product, denoted by 10 overall, which is later cut through at a separating plane T to produce two screw-connectable housing parts of a valve housing. The intermediate product 10 has two front walls 12, 14, each of which carries a connection piece 16 and/or 18.

At the bottom end of the intermediate product 10 a transverse connection piece 22, which later represents the outlet connection piece of the valve housing, is moulded on in the vicinity of the connection piece 18 which later represents the inlet connection piece of the valve housing.

The intermediate product 10 is produced by the internal high-pressure forming process from a cylindrical blank 20 shown in broken lines in FIG. 1.

Above the separating surface denoted by T, a connection section 24 is pressed radially outwards and is connected via a shoulder section 26 to an upper peripheral wall section 28 on which flattenings 30 on which a wrench can be placed are provided.

Below the separating surface T a further connection section 32 is provided in the intermediate product 20, which connection section has a larger diameter than the connection section 24 and is connected thereto via a shoulder section 34.

The diameter of the sleeve-shaped blank 20 is selected in such a way that it corresponds to the section of the peripheral wall of the intermediate product 10 which has the smallest diameter or is smaller than it. By means of internal high-pressure forming (sealing of the open ends of the blank 20 and application of high pressure to the internal chamber of the blank 20 sealed in this way) the corners of the flattenings 30, the connection section 24, the connection section 32 and the transverse connection piece 22 are then produced by resting the wall of the blank 20 against the correspondingly contoured internal surface of an internal high-pressure forming mould. Using flow forming tools, a force directed radially inwards is then exerted on the end sections of the blank contoured in this way, wherein an axial force is applied to these axial end sections at the same time. In this way material is displaced to form the front walls 12, 14 and the connection pieces 16, 18 having a small diameter are obtained.

The intermediate product 10 is thus obtained in a two-stage process which comprises as the first step an internal high-pressure forming of a cylindrical blank and as the second step a pressure forming of the end sections of the first intermediate product obtained after the internal high-pressure forming.

A two-stage process of the intermediate product 10 of this kind is preferably used when the wall thickness of the intermediate product 10 is intended to be large. In the embodiment considered here, in which the intermediate product 10 is intended to be used to produce a two-part housing for a safety valve, the wall thickness in the intermediate product 10 is approx. 5 mm. By selecting a pressure process to produce the connection pieces 16, 18, there is no need to undertake any excessive radial widenings to produce the sections of the intermediate product 10 which lie radially outside the blank 20, widenings which can introduce the risk of a fairly large reduction in wall thickness even when material is displaced in an axial direction.

As an alternative, in such cases in which the wall thickness of the intermediate product is smaller and the constant nature of the wall thickness is less critical, the starting point can be a blank 20 whose diameter corresponds to the diameter of the connection pieces 16, 18. In this case the entire forming of the blank into the intermediate product 10 can be carried out with the internal high-pressure forming process.

Figure 4:
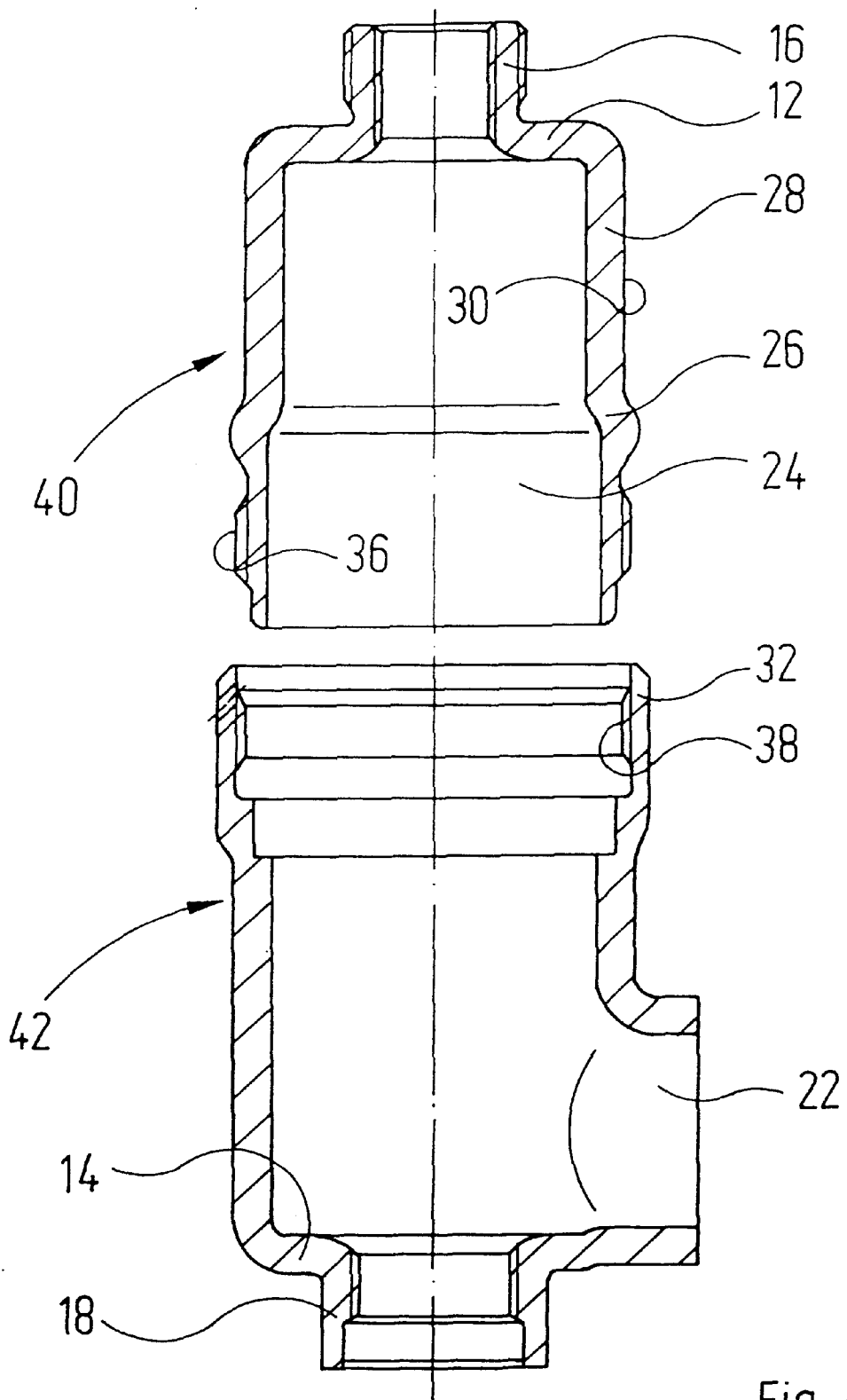
FIG. 4 shows a similar view to FIG. 1, but in which the two housing parts of the valve housing are reproduced after cutting of the intermediate product of FIG. 1 and after slight mechanical finish-machining.

To produce a two-part tubular valve housing from the intermediate product 10 shown in FIG. 1, the intermediate product 10 is cut through at the separating surface T, wherein the shoulder section 34 is completely removed. A thread 36, which is shown in FIG. 4, is then cut on the outside of the connection section 24. A thread 38 which matches the thread 36 is also cut in the internal surface of the connection section 32.

The difference in diameter between the connection sections 24 and 32 is selected in such a way that the free crests of the threads are only a short stretch behind the surface of the connection section in question, so that the thread can be produced with little material removal and yet it is ensured that sufficient material is available as far as the crests of the threads.

Further mechanical machining steps in the housing parts 40 and 42 of the valve housing obtained by cutting the intermediate product 10 comprise the provision of an internal thread and an external thread on the connection piece 16 and an internal thread on the connection piece 18 and in the opening of the connection piece 22, which later represents the outlet of the valve housing, and a bore at the bottom end of the connection section 32.

The threads and bores are shown in broken lines in FIG. 1.

When the housing parts 40 and 42 are completed, a valve face is built into the interior of the housing part 42, then the valve closure part and its associated regulating mechanism is built into the housing part 40. The two housing parts 40 and 42 are then screwed together.

It will be seen that the valve housing described above can be manufactured very inexpensively overall, and yet has no mechanical weaknesses. The two housing parts can be connected together simply and reliably.

Wall thicknesses of the blank 20 of up to 25 mm are considered for valve housings subject to higher pressures. The wall thickness of the blank can be reduced to as little as 3 mm for valve housings exposed to low pressures only. For normal safety valve housings, preferred wall thicknesses are in the region of 5 to 7 mm.

We claim:

1. A process for producing a substantially tubular valve housing substantially closed on all sides, which has at least two valve housing parts (40, 42) detachably connected together, comprising the following steps:

a) producing by internal high-pressure forming from a substantially sleeve-shaped blank (20) an intermediate product (10) which corresponds to the form of the first valve housing part (40) in a first section thereof and to the form of at least one further valve housing part (42) in at least one further section thereof, said first and further sections being of different diameter and having connection sections (24, 32) adjacent to said first and further sections which are connected via a shoulder (34);

b) cutting through said intermediate product (10) at least one separating surface (T) lying between said first and further sections to form said at least two valve housing parts (40, 42) and completely removing the shoulder (34)

c) joining the valve housing parts (40, 42) in a pressure-tight manner.

2. A process as claimed in claim 1, wherein each of said connection sections having an external diameter and an internal diameter, the external diameter of one of the connection sections (24) having a smaller diameter substantially coinciding with an external diameter of a given connection thread (36, 38) and the internal diameter of another of said connection sections (32) having a larger diameter substantially coinciding with the external diameter of said given connection thread (36, 38).

3. A process as claimed in claim 1, wherein the wall thickness of the intermediate product is more than 3 mm.

4. A process as claimed in claim 3, wherein the wall thickness of the intermediate product is less than 25 mm.

5. A process as claimed in claim 4, wherein the wall thickness of the intermediate product is between 5 and 7 mm.

6. A process for producing a substantially tubular valve housing substantially closed on all sides, which has at least two valve housing parts (40, 42) detachably connected together, comprising the following steps:

a) producing by internal high-pressure forming from a substantially sleeve-shaped blank (20) an intermediate product (10) which corresponds to the form of a first valve housing part (40) in a first section thereof and to the form of at least one further valve housing part (42) in at least one further section thereof, said first and further sections being of different diameter and having connection sections (24, 32) adjacent to said first and further sections which are connected via a shoulder (34), each of said connection sections having an external diameter and an internal diameter, the external diameter of one of the connection sections (24) having a smaller diameter substantially coinciding with an external diameter of a given connection thread (36, 38) and the internal diameter of another of said connection sections (32) having a larger diameter substantially coinciding with the diameter of said given connection thread (36, 38);

b) cutting through said intermediate product (10) at least one separating surface (T) lying between said first and further sections to form said at least two valve housing parts (40, 42) and completely removing said shoulder (34)

c) providing threads (36, 38) on said connection sections, and;

d) joining said valve housing parts (40, 42) in a pressure-tight manner.

* * * * *